March 10, 1970 R. W. DOCHTERMAN 3,500,083
NOISE EXCITATION SUPPRESSION MOTOR MOUNTING SYSTEM
Filed Dec. 26, 1968 2 Sheets-Sheet 1
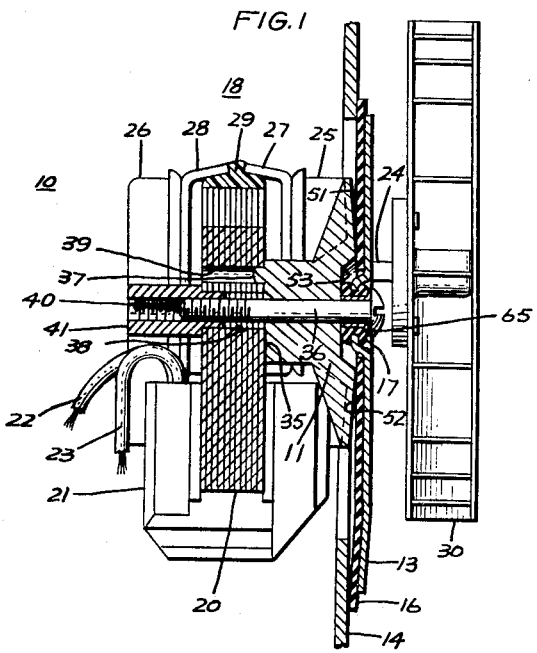
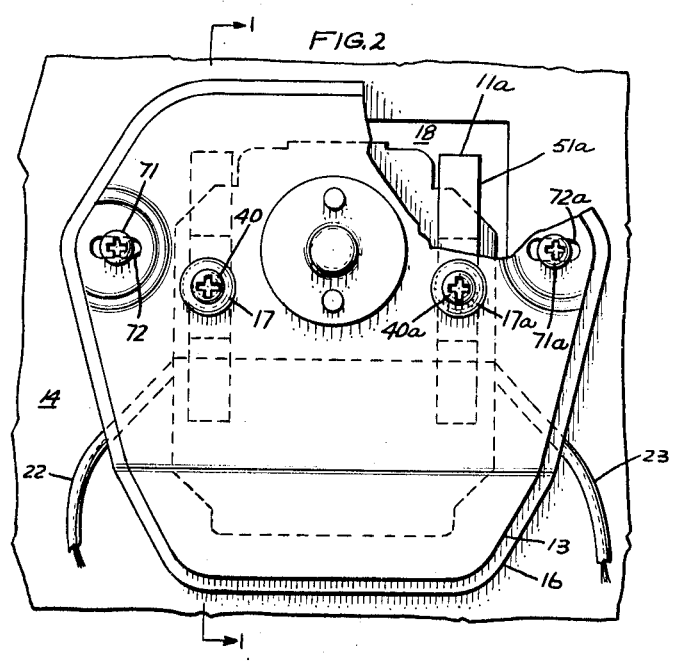
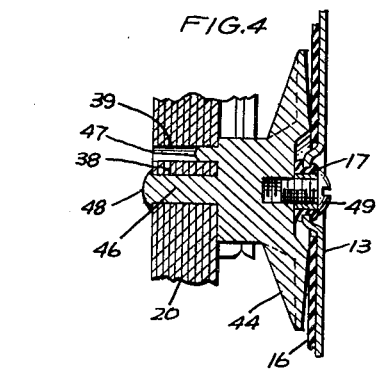
INVENTOR.
Richard W. Dochterman,
BY John M. Stoudt
Attorney.

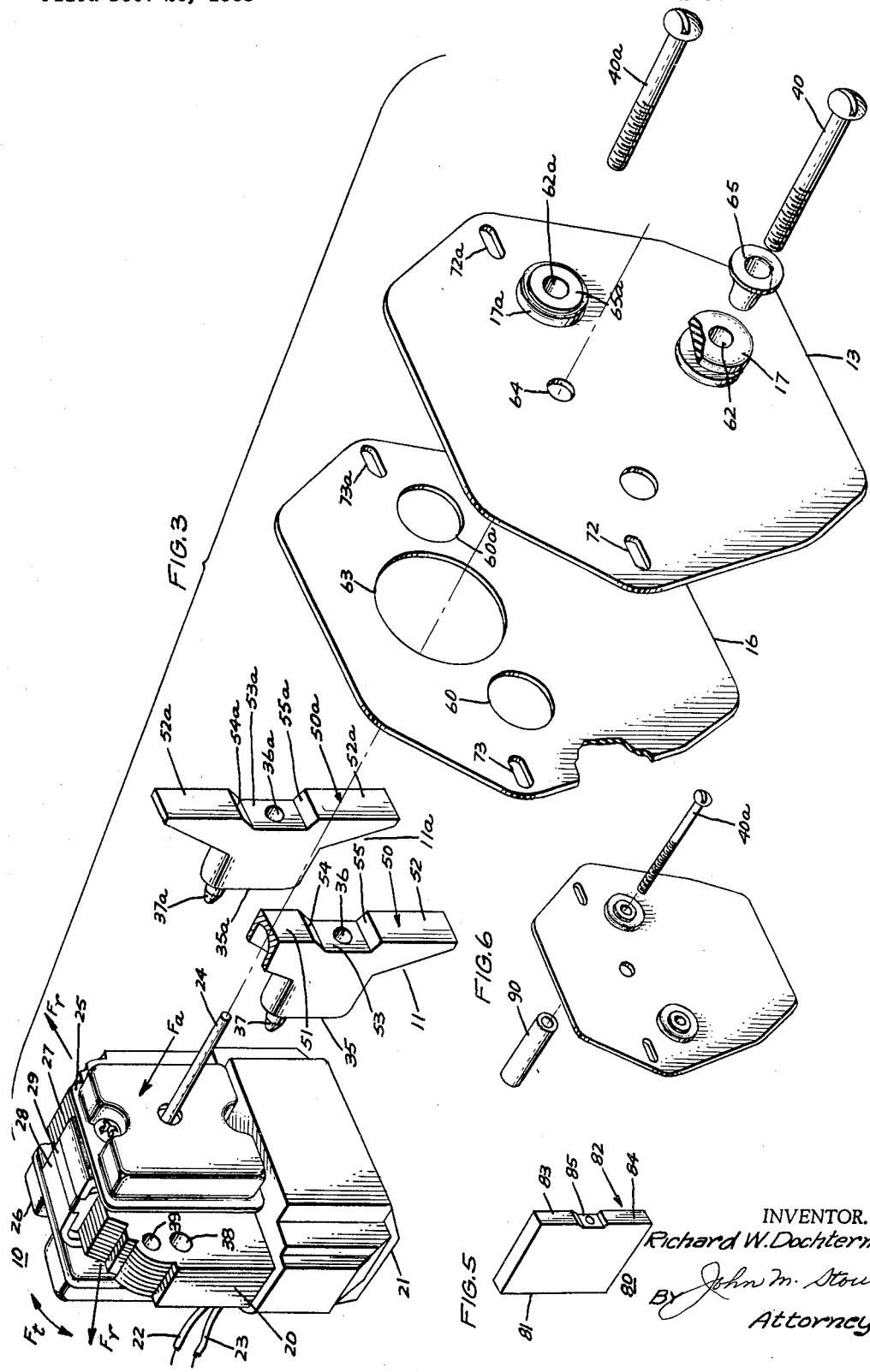

United States Patent Office 3,500,083
Patented Mar. 10, 1970

3,500,083
NOISE EXCITATION SUPPRESSION MOTOR MOUNTING SYSTEM
Richard W. Dochterman, Fort Wayne, Ind., assignor to General Electric Company, a corporation of New York
Filed Dec. 26, 1968, Ser. No. 787,104
Int. Cl. F16f *15/08;* H02k *5/24*
U.S. Cl. 310—51          8 Claims

ABSTRACT OF THE DISCLOSURE

An electric motor vibration isolation mounting system especially effective in controlling transmission of vibration-producing forces in a motor which excite harmonic vibration in the motor surroundings. The rear faces of first and second mounting studs are each secured to the same side of the stator core of a motor. The front faces of the mounting studs are each formed with radial legs extending from a central portion. The legs have regions resting against a flat sheet of resilient material which in turn is disposed in a non-binding relationship between the radial legs and a support. Fasteners extend through the support to secure the mounting stud members to the support at the central portion of their front faces. The legs are slightly inclined axially and radially from the elastomeric material so that a limited tilting movement of the motor is permitted in response to vibration-producing forces generated during motor operation. Resilient means are interposed between the central portions of the mounting studs and the support. The motor is supported so that limited vibratory motion in each degree of freedom is permitted and the transmission of motor vibration is reduced.

BACKGROUND OF THE INVENTION

This invention relates to improved dynamoelectric machine mounting arrangements, and more particularly to such arrangements wherein transmission of the vibration-producing forces within the machine to the support on which the machine is mounted is effectively controlled.

In the construction of a system to mount a motor in a domestic application, for example, driving a blower in a frost-free refrigerator, it is highly desirable to provide an arrangement in which vibrations produced by the motor are isolated from the environment in which the motor is mounted. There are three primary sources of undesirable vibration that appear in a typical 60 Hz. (cycles per second) fractional horsepower motor. The first is a torsional vibration resulting from pulsation due to line voltage excitation of the motor. The frequency of this vibration is double the line frequency, or 120 Hz. when the motor is supplied by a 60 Hz. source. Magnetic vibration of the rotary assembly produces an axial vibration of double line frequency. In addition, radial vibration is produced due to rotation of the rotary assembly. A motor rotating at 3,000 r.p.m. produces a radial vibration having a frequency of 50 Hz. A blower may be directly mounted on the rotor, or a pulley which provides a frictional driving connection, as for a fan belt, may be provided. In either case the amplitude of the radial vibration is increased due to any unbalance in the rotational components such as blower, rotor, or the like and radial stresses produced by the frictional driving arrangement.

Each of these modes of vibration may excite vibration in components of the apparatus which are resonant to the exciting frequency of the motor or to harmonics of the exciting frequency. Resonant vibration in apparatus components results in undesirable airborne noise. For example, an undesirable 1,000 Hz. noise due to vibration of a panel to which the motor is mounted may result. A satisfactory motor mounting arrangement must damp motor vibrations. Effective vibration isolation requires that relative motion be allowed between the motor and the support. However, allowing a great deal of relative motion in a mounting system results in providing a weak static support for a motor. In many applications, large direct forces may be applied to a motor mounted to a support and possibly disengage the motor from the mounting system. This could occur, for example, when an apparatus including a motor mounting system is dropped onto a shipping platform. It is therefore desirable to provide a mounting system which not only provides sufficient vibration damping, but also provides a strong static support for a motor.

Prior motor mounting arrangements have included a plurality of mounting members annularly spaced with respect to the rotor, each of which includes resilient means interposed between the motor and a support. In such arrangements, a plurality of resilient members must be provided, and associated hardware must be provided for each piece. Such an arrangement results in expense in manufacture and installation.

SUMMARY OF THE INVENTION

Accordingly, it is an object of the present invention to provide an improved arrangement for effectively isolating all modes of vibration due to the vibration-producing forces within a dynamoelectric machine from the machine support and apparatus in which the machine is employed.

It is also an object of the present invention to provide an improved vibration damping mounting arrangement capable of isolating noise-exciting forces from an apparatus in which a motor is mounted which provides strong static support for the motor.

It is a further object of the present invention to provide an improved vibration isolation mounting arrangement which overcomes the problems and difficulties mentioned above with a construction that is economically manufactured and is simple to install.

In carrying out the objects of my invention in one form, I have provided an improved arrangement especially effective in isolating vibration-exciting forces in a motor from a motor support. The motor is mounted by means of a mounting stud member which is formed to provide static support to maintain the motor in spaced relation with the motor support. Limited movement of the motor within all degrees of freedom is permitted to provide for effectively isolating all modes of vibration produced within the motor.

In one form, the motor includes a stationary assembly having first and second faces, such as end faces of a stator, and a rotatable assembly supported for relative rotation by the stationary assembly. At least one mounting stud member is provided having one face secured to one face of the stator core. The face remote from the core is formed with radially extending legs which have separated regions resting against a flat sheet of resilient material which in turn is disposed against the support. The legs may be slightly inclined axially and radially away from the resilient sheet to provide positive regions for cooperation with the support. Resilient means are disposed between the support and the central portion of the stud member. The stud member is secured to the support at its central portion, and the radial legs are maintained in non-binding relationship with the resilient sheet. This arrangement supports the motor such that it tilts in a number of directions with a limited rocking motion in response to motor vibrations and effectively controls transmission of vibration and noise producing forces from the supporting structure.

BRIEF DESCRIPTION OF THE DRAWINGS

The subject matter which I regard as my invention is particularly pointed out and distinctly claimed in the concluding portion of the specification. My invention, itself, both as to its organization and method of operation, together with further objects and advantages thereof, may be better understood by reference to the following description taken in connection with the following drawings.

In the drawings:

FIGURE 1 is a side view in which a cross section is taken to show details of one type of small dynamoelectric machine, by way of exemplification, and its support incorporating one form of the present invention, in which the cross section is taken along the line I—I shown in FIGURE 2;

FIGURE 2 is an elevation of the arrangement shown in FIGURE 1, partially broken away, illustrating further details of the one form of the machine mounting arrangement;

FIGURE 3 is an exploded isometric view further illustrating details of the machine mounting arrangement of FIGURE 1;

FIGURE 4 is a side partial view illustrating an alternative manner in which the mounting member may be secured to the dynamoelectric machine and support of FIGURE 1;

FIGURE 5 is an isometric view of an alternative form of mounting member which may be incorporated in the arrangement of FIGURE 1; and FIGURE 6 is a partial isometric view of an alternative form of the mounting arrangement in which a static supporting member is used to replace one mounting member in the exemplification of FIGURES 1-3.

DESCRIPTION OF THE PREFERRED EMBODIMENTS

Referring now to the drawings in more detail, one embodiment of my invention is disclosed in FIGURES 1-3 in connection with a fractional horsepower, alternating current, shaded pole induction electric motor 10. The motor 10 is supported by means of mounting stud members 11 and 11a in spaced relation with a support 13. The support 13 may, if desired, be mounted on a panel 14 having an opening 15 to receive the motor 10 in an enclosure 18. The panel 14 may, for example, be an inner wall of a refrigerator cabinet. Resilient means are disposed between the mounting stud members 11 and 11a and the support 13. A resilient pad 16 is mounted between the mounting stud members 11 and 11a and the support 13 and resilient annular rings 17 and 17a are mounted on the support 13 to abut the central portions of the mounting stud members 11 and 11a respectively. Details of the mounting arrangement will be described hereinafter.

For the purpose of disclosing the invention, the motor of the exemplification is of the type more fully disclosed in the H. C. Kaeding Patents 3,196,297 and 3,270,227, and the J. E. Baclawski Patent 3,248,241, all assigned to the same assignee as the present invention. Briefly, the motor 10 includes a stator 20 of a stationary assembly formed with a laminated core and an electrical coil or winding, enclosed within an imperforate covering of insulating material 21 and mounted between depending legs of a stator yoke section. The winding is adapted for connection to a suitable source of alternating current power through leads 22 and 23, such as a 115 volt, 60 Hz. source (not shown). A rotatable assembly 24, having a single output shaft portion, is mounted for relative rotation with respect to the stator 20 by a pair of end frames or bearing assemblies 25, 26 (part of the stationary assembly) attached to the stator by generally U-shaped metal brackets 27, 28 which have opposed legs cemented to the periphery of the stator, as indicated at 29 in FIGURES 1 and 3. Among the many applications for which the motor 10 is suited is the driving of a blower in a frost-free refrigerator. Accordingly, a blower 30 may be mounted on the rotatable assembly 18.

The preferred arrangement will now be considered in which the motor 10 of the exemplification is supported to damp the transmission of noise-exciting forces, especially those resulting from torsional vibrations and rotating mass unbalance, from the motor 10 during operation of the equipment in which the motor is employed. The directions of the various modes of vibration in the motor are described with respect to the axis of rotation of the rotatable assembly 24. The torsional force, indicated as $F_t$ in FIGURE 3, is due to alternating frequency pulsations of the stator winding. The radial force $F_r$, is due to unbalance in the rotating motor and load. In the exemplification, the load comprises the blower 30. The radial force, $F_r$, emanates from the rotatable assembly 24. Also, there is an axial force $F_a$ due to magnetic vibration of the rotor. Each mode of vibration produces a certain amount of noise. More importantly, each mode of vibration is capable of exciting resonant vibration at harmonic frequencies in elements of the motor environment. Such vibration causes undesirable airborne noise. In the exemplification shown in FIGURES 1-3 the mounting system is sufficiently deflectable in response to each mode of vibration so that the force transmitted from the motor 10 to the support 13 is not sufficient to excite harmonic vibration and produce noises in the equipment in which the motor is employed above the accepted levels for this type of application.

As seen in FIGURE 2, the exemplification is made symmetrical with respect to the vertical centerline of the support 13. While the present invention may take any form consistent with the characteristics described below, a symmetrical arrangement provides for simplicity in manufacture and assembly. Therefore, reference numerals followed by the letter *a* are used to denote elements in the right half of the arrangement as seen in FIGURE 2, corresponding to those shown in FIGURE 1. Since each side of the present arrangement operates substantially independently and substantially identically to the other, the present arrangement may be fully described by analyzing the portion shown in FIGURE 1.

The mounting stud member 11 is formed with a rear face 35 so as to be flush with the face of the stator 20 so that the mounting stud member 11 may be rigidly mounted to the motor 10. Any suitable means may be employed for fastening. For example, any epoxy cement could be used. In the exemplification, mechanical securing means are utilized. An axial bore 36 is formed in the mounting stud member 11 for receiving a fastener, and an anchoring pin 37 extends from the rear face 35. Holes 38 and 39 are punched in the stator core 11 and respectively aligned with the bore 36 and anchoring pin 37. A screw 40 may be inserted through the support 13 and resilient pad 16 so as to extend through the bore 36 and hole 28, entering the core at one face and extending to project beyond the opposite face. A nut 41 may be employed at the opposite face of the stator 20 to retain the screw 40. Any other suitable means may be provided. As seen in FIGURE 4, a mounting stud member 44 is provided including a key member 46 and anchoring pin member 47 extending from a rear face 35. The key member 46 and anchoring pin 47 are respectively received in the holes 38 and 39 and the mounting member 44 is secured to the stator 20 by means of a rivet 48. A screw 49 retains the mounting member 44 to the support 13.

The mounting stud member 11 is rigidly mounted to the stator 20 so that vibratory forces are transmitted to a front face 50 spaced from the rear face 35. The front face 50 includes opposed radially extending leg portions 51 and 52 which are joined by a central portion 53 which is recessed between the radial legs 51 and 52. This configuration permits a limited and cushioned tilted movement of the motor in response to vibratory forces relative to support 13. The leg portions 51 and 52 may be slightly inclined and extend axially away from the resilient sheet 16 so as to contact it at separated regions 54 and 55 respectively. Inclining the radial legs 51 and 52 reduces the surface area of contact with the resilient pad 16 when neither leg engages the pad 16 in response to vibration and improves vibration isolation. The mounting members 11 and 11a may conveniently comprise zinc castings. Such castings may be economically made with sufficiently close tolerances for the purposes of the mounting system. Other suitable materials could also be used.

An aperture 60 is formed in the resilient pad 16 to surround the recessed portion 53 of the mounting stud member 11. The resilient ring 17 is mounted on an aperture 62 formed in the support 13 and aligned with the bore 36 in the mounting stud member 11. The aperture 62 may be recessed from the plane of the support 13 so that the head of the screw 40 is removed from the air stream produced by the blower 30. This prevents generation of noise due to air hitting the screw 40. The resilient ring 17 is received in the aperture 60 and abuts the recessed portion 53. In this manner, the mounting stud member 11 is spaced from the support 13 so it is maintained in non-binding contact with the resilient pad 16. In addition, the resilient ring 17 damps axial and torsional vibration. A spacing bushing 65 may be inserted in the resilient ring 17 concentric with the screw 40. The bushing 65 limits compression of the resilient ring 17 while allowing proper fastening of the screw 40 into threaded nut 41. Apertures 63 and 64 in the pad 16 and the support 13, respectively, are provided to surround the rotor of the rotatable assembly 24.

No adhesive need be used to secure the resilient pad 16 in place. The non-binding pressure exerted by the mounting stud members 11 and 11a is sufficient to retain the resilient pad 16 in place, but not so great as to compress it so that vibration damping is prevented. Obviating the need for an adhesive increases the simplicity and economy of the mounting system. The material of which the resilient pad 16 is constructed is chosen for suitability with respect to the magnitude of vibration to be damped. In the exemplification, 70 durometer neoprene with a nylon cloth finish was utilized. This material is especially suited for use in domestic refrigerator applications since it produces no objectionable odors. The resilient pad 16 is made thick enough to allow sufficient movement of the radial legs 51 and 52 as they press into the pad 16 in response to motor vibration.

The present system also provides for additional advantages in applications in which the support 13 is mounted on a panel 14. As seen in FIGURE 2, mounting screws 71 and 71a may be respectively inserted through apertures 72 and 72a in the support 13 and through apertures 73 and 73a in the resilient pad 16 for mounting to the panel 14. The lower portion of the support 13 may be bent toward the panel 14. When secured to the panel 14, the support 13 exerts pressure on the resilient pad 16 against the panel 14. In this manner the present arrangement also provides for sealing of the enclosure 18 in which the motor 10 is received. This sealing arrangement prevents moisture from entering the motor enclosure 16 and prevents fumes from escaping should a severe motor fault occur.

The mounting stud member 11 may comprise any configuration which provides for rigid mounting to the stator core 20 at the rear face and non-binding relation with the resilient pad 16 in order to permit a limited tilting motion at the front face. In the embodiment of FIGURES 1–3, the mounting stud member 11 is rectangular in shape at its rear section and its front section is that of a truncated triangle. This configuration permits the inclusion of long radial legs 51 and 52 at the front face of the mounting stud member 11. At the same time, the rear face 35 of the mounting stud member is small enough to fit on the motor core above the encapsulation 21 which covers the stator winding. However, any other suitable configuration which will fit on a motor may be used. As seen in FIGURE 5, a mounting stud member 80 having a rectangular cross section could be provided. The requisites for construction of the mounting member 80 are that it have a rear face 81 to fit flush against a motor for rigid mounting, and that it include a front face 82 including radial legs 83 and 84 joined by a central portion 85. The mounting stud member 80 must be secured to a support such as the support 13 at a central portion in order that it be able to pivot to permit a limited rocking motion so that the legs 84 and 85 alternately engage the surface of the resilient mounting pad 16. The necessary length of the legs 83 and 84 is that which is long enough to provide contact of a region thereof with a sufficient surface area of the mounting pad 16 to provide the desired vibration damping.

In addition, more than two radial legs could be provided on a mounting member. For example, radial legs perpendicular to the legs 51 and 52 on the mounting stud member 11 could be provided. However, sufficient unbalance to produce vibratory forces so that such additional support would be required would not be present in the motor 10 of the exemplification. Neither the mounting member 80 nor the mounting stud member 11 need be vertically mounted. In the exemplification of FIGURES 1–3, the mounting stud members 11 and 11a are mounted vertically because this operation provides for this configuration, provides for optimum support of the motor 10, and for isolation of the principal mode of vibration. However, the mounting stud members may be mounted in a direction so that the motor will rock on the legs 51 and 52 in the direction produced by whichever mode of vibration may be the strongest.

Furthermore, in certain applications, sufficient isolation may be provided by the use of one mounting stud member. If desired, for economy of manufacture the exemplification of FIGURE 6 could be employed. FIG-5 is a partial view of an arrangement similar to that shown in FIGURE 3. However, the mounting stud member 11a is replaced with a static supporting mounting member 90. The static supporting member is shown as being a metal tube which receives the screw fastener 40a. Vibration damping is provided by the mounting stud member 11 as in the exemplification of FIGURE 3. The mounting member 90 simply serves to provide static support for the motor.

In each of the above exemplifications, two mounting members are used. This arrangement provides for a maximum in economy in the manufacture of the vibration isolating mounting arrangement while providing for a maximum of static support. The static support provided in each of these arrangements is relatively rigid and capable of withstanding a strong, direct force applied to the motor. If the unit should be dropped to the ground during shipping, no harm would result. However, any number of vibration-isolating members could be provided. If the configuration of a motor permitted it, a single mounting stud member could be utilized to provide both static support and vibration damping.

The motor 10 used in the exemplification of the invention was a two pole motor operating at 3,000 revolutions per minute and was energized from a 60 Hz. power supply. The frequency, $W_{Ft}$, of the torsional force is 120 Hz., the frequency $W_{Fr}$, of the radial force was 50 Hz., and the frequency $W_{Fa}$ of the axial force $F_a$ was 120 Hz. A blower was mounted on the rotating assembly 18 and the unit was mounted in a typical domestic refrigerator with an internal air circulating system. No vibration was produced which was sufficient to produce harmonic vibrations in the panel 14 to which the support 13 was mounted or in other components of the refrigerator subject to such vibrations above well established acceptable levels for such application.

It should be apparent to those skilled in the art that while I have shown and described what at present is considered to be the preferred embodiments to my invention in accordance with the patent statute, it is understood that modifications can be made without actually departing from the true spirit and the scope of this invention.

What I claim as new and desire to secure by Letters Patent of the United States is:

1. In a system for mounting an electric motor in which torsional, radial and axial vibrations with respect to an axis of rotation of the motor are produced, and are effectively isolated from a support, the combination comprising:
   (a) a stationary assembly having first and second faces adapted to be in spaced relation to the support and a rotatable assembly having an axis of rotation and being supported for relative rotation with respect to the stationary assembly;
   (b) at least one mounting member having a rear face secured to said first face of said stationary assembly and a front face having a portion adapted to be secured to the support and radial legs extending from said portion;
   (c) first resilient means interposed between said radial legs and the support;
   (d) second resilient means positioned between the support and said central portion of said mounting member for maintaining said legs in a non-binding relationship with said first resilient means; and
   (e) means for securing the central portion of said mounting member to said support.

2. A system according to claim 1 in which said first resilient means comprises a pad of resilient material, said second resilient means comprises a resilient annular ring mounted on an aperture formed in said support and aligned with the central portion of said mounting member, and said central portion is recessed between said radial legs to receive said resilient annular ring.

3. A system according to claim 2 wherein the portions of said radial legs adjacent said central portion contact said resilient pad and said radial legs extend axially away from said resilient pad.

4. A system according to claim 3 wherein said mounting members include first and second radial legs extending in opposite directions from said central portion and first and second mounting members are included, each having a rear face fixedly mounted to said first face of said stationary assembly on opposite sides of the axis of rotation of said rotatable assembly.

5. In a vibration isolation arrangement for mounting a motor in which torsional, radial and axial vibrations produced with respect to an axis of rotation of the motor are effectively isolated from a support, the combination comprising:
   (a) a motor having a stationary assembly including first and second faces and a rotatable assembly supported for relative rotation by said stationary assembly;
   (b) at least one mounting member having a first face secured to said first face of said stationary assembly and having a second face formed with a central portion adapted to be movably secured to the support, and two separated regions extending toward the support; and
   (c) means for spacing said central portion from the support so that said separated regions are effective to provide tilting movement of the motor relative to the support in more than one direction in response to vibration-producing forces generated during motor operation for isolation thereof from the support.

6. A system according to claim 5 wherein said mounting member includes first and second radial legs extending in opposite directions from said central portion, with said central portion being recessed between said first and second legs to provide surfaces adapted for tilting of the mounting member in more than one direction relative to the support.

7. In a vibration damping arrangement for mounting a motor having a stationary assembly including first and second faces and a rotatable assembly supported for a relative rotation by said stationary assembly, the combination comprising:
   (a) at least one mounting member having a rear face adapted to be secured to the first face of said motor, and a front face having a central portion adapted to be secured to said support and separated regions adapted to provide tilting action of the motor;
   (b) a support to which the front face of said mounting member is secured;
   (c) a resilient pad disposed respectively between each of said separated regions and the support;
   (d) resilient means positioned between said central portion said mounting member and said support for maintaining said regions in a non-binding relationship with said resilient pad; and
   (e) means for securing said central portion so said support.

8. A system according to claim 7 wherein first and second mounting members are employed for mounting to the first face of the motor on opposite sides of the rotatable assembly, each mounting member includes first and second regions extending in opposite directions, said central portion is recessed between said regions, and said regions contact said resilient pad at a portion adjacent said central portion and extend axially away from said resilient pad.

References Cited

UNITED STATES PATENTS

| | | | |
|---|---|---|---|
| 1,526,882 | 2/1925 | Trimmer | 248—18 |
| 1,823,555 | 9/1931 | Naul | 310—172 |
| 2,580,313 | 12/1951 | Morrill | 248—26 |
| 3,154,704 | 10/1964 | Shaffer | 310—51 |
| 3,317,124 | 5/1967 | Morrill | 230—273 |

WARREN E. RAY, Primary Examiner

U.S. Cl. X.R.

248—15, 26; 310—91